(12) United States Patent
Cheung

(10) Patent No.: US 7,762,487 B2
(45) Date of Patent: Jul. 27, 2010

(54) MANUALLY DRIVABLE FOOD CUTTER

(75) Inventor: Siu Ling Cheung, Kowloon (HK)

(73) Assignee: Keysun Industrial Company Limited, Kowloon (HK)

( * ) Notice: Subject to any disclaimer, the term of this patent is extended or adjusted under 35 U.S.C. 154(b) by 173 days.

(21) Appl. No.: 11/740,966

(22) Filed: Apr. 27, 2007

(65) Prior Publication Data

US 2008/0111012 A1 May 15, 2008

(30) Foreign Application Priority Data

Nov. 15, 2006 (CN) .................... 2006 2 0147426 U

(51) Int. Cl.
*A47J 42/06* (2006.01)

(52) U.S. Cl. .................................................. 241/169.1

(58) Field of Classification Search ................ 241/168, 241/169.1, 199.1, 282.1, 282.2, 292.1
See application file for complete search history.

(56) References Cited

U.S. PATENT DOCUMENTS

| 7,059,553 | B2 | 6/2006 | Mueller et al. |
| 7,422,169 | B2 * | 9/2008 | Mueller ...................... 241/168 |
| 2002/0153440 | A1 * | 10/2002 | Holcomb et al. ......... 241/169.1 |

* cited by examiner

*Primary Examiner*—Faye Francis
(74) *Attorney, Agent, or Firm*—Rabin & Berdo, P.C.

(57) ABSTRACT

A manually drivable food cutter includes a cap with a axle journal, a blade shaft including one or more blades disposed thereon, a vessel connected to the blade shaft, a base connecting the cap and the vessel, a gear shaft set above the base, and a gear part transmitting the rotation of the cap to the blade shaft on the base, the gear part including one or more gears. The advantages of the apparatus are that it can be conveniently operated and the units do not fall apart easily.

8 Claims, 3 Drawing Sheets

MANUALLY DRIVABLE FOOD CUTTER

CROSS-REFERENCE TO RELATED APPLICATION

This non-provisional application claims priority under 35 U.S.C. §119(a) on Patent Application No. 200620147426.0 filed in China on Nov. 15, 2006, the entire contents of which are hereby incorporated by reference.

FIELD OF THE INVENTION

The invention relates to a manually drivable apparatus for food processing, in particular to a manually drivable food cutter.

PRIOR ART

A manually driven apparatus for food comminuting is disclosed in the U.S. Pat. No. 7,059,553. The apparatus includes a rotationally symmetrical vessel configured to receive material to be cut, a rotationally symmetrical cover configured to nonrotatably mount on the vessel, a shaft rotatably mounted centrally along an axis of the vessel, and at least one blade mounted to the shaft. The apparatus also includes a rotatable drive part configured to drive at least the shaft, and includes a gear arranged in the cover and configured to operatively connect the rotatable drive part to the shaft. However the apparatus mentioned above has the shortcomings that it is inconvenient to operate and the units of the apparatus can easily fall apart.

SUMMARY OF THE INVENTION

It is the object of the invention to provide an apparatus that can be conveniently operated and the units of which do not fall apart.

This object is achieved by the features below:

A manually drivable food cutter includes a cap with a axle journal, a blade shaft including one or more blades, a vessel connected to the blade shaft and a base connecting the cap and the vessel, a gear shaft set above the base, and a gear part which can transmit the rotation of the cap to the blade shaft on the base, and that the gear part includes one or more gears.

The gear part includes a big gear, a small gear, a left gear and a right gear, the axle shaft is located on the big gear, and the upper part of the left and right gears mesh with the big gear, while the lower part of the left and right gears mesh with the small gear, and the gear shaft is connected to the small gear.

There are one or more protrusions on the inner edge of the bottom of the base, and there are also one or more corresponding slots on the outer edge of the upper surface of the vessel.

The upper end of the gear shaft goes sequentially through the slots in the middle of the big gear and the small gear and is connected to the cap, and the lower end of the gear shaft is connected to the blade shaft in the orifice on the base.

There is a slot on the left and right gear respectively for the mounting member on the base to go through and connect to the cap.

There is a protrusion on the inner surface of the vessel to connect the vessel to the blade shaft.

The advantages of the apparatus are that it can be conveniently operated and the units do not fall apart easily.

DESCRIPTION OF THE PREFERRED EMBODIMENTS

The invention is explained in more detail below with reference to figures which show only an exemplary embodiment.

Figure 1:
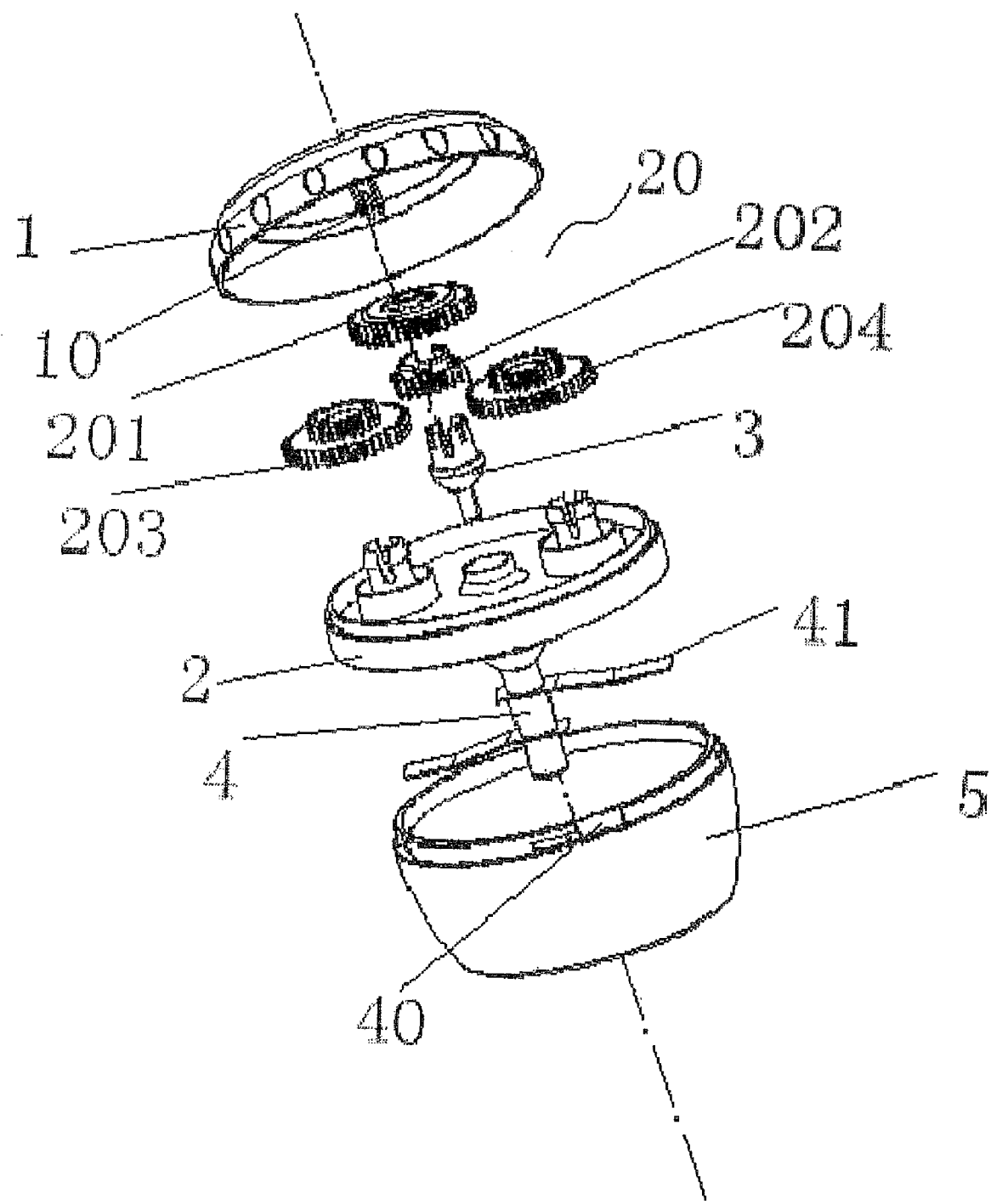
FIG. 1 shows an exploded view of the apparatus according to the invention.
Figure 2:
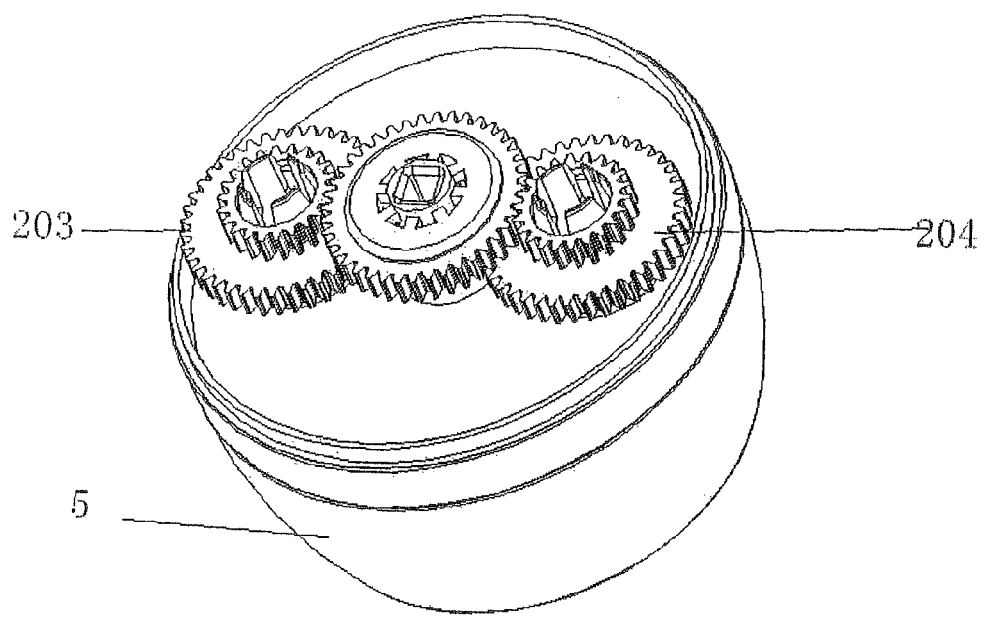
FIG. 2 shows a view of the gear part according to the invention.
Figure 3:
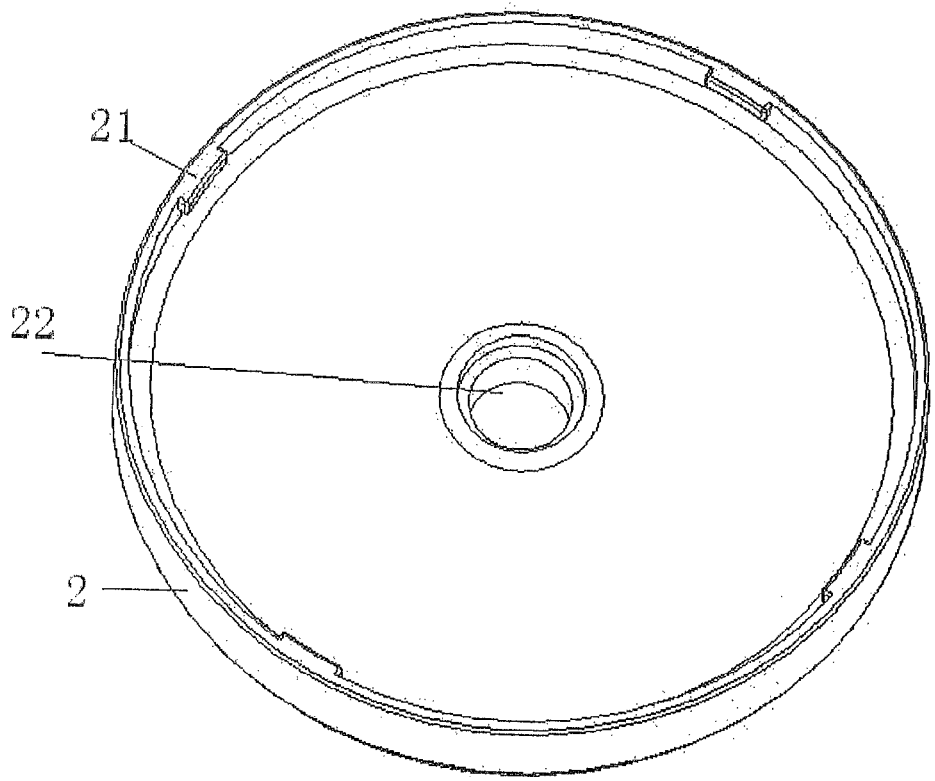
FIG. 3 shows a view of the protrusion according to the invention.
Figure 4:
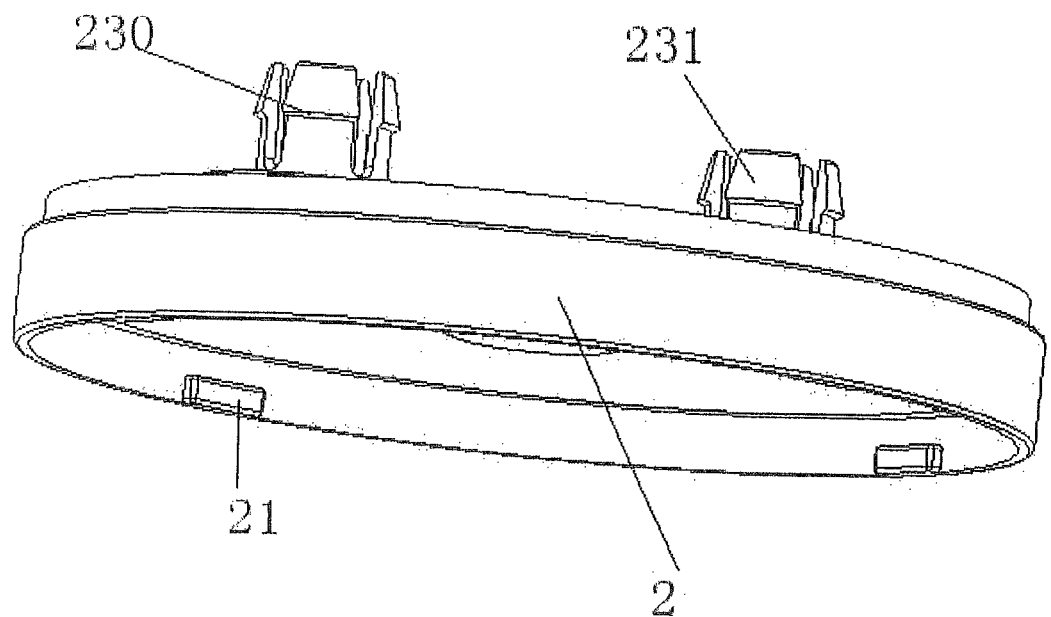
FIG. 4 shows a view of the protrusion according to the invention in a different perspective.
Figure 5:
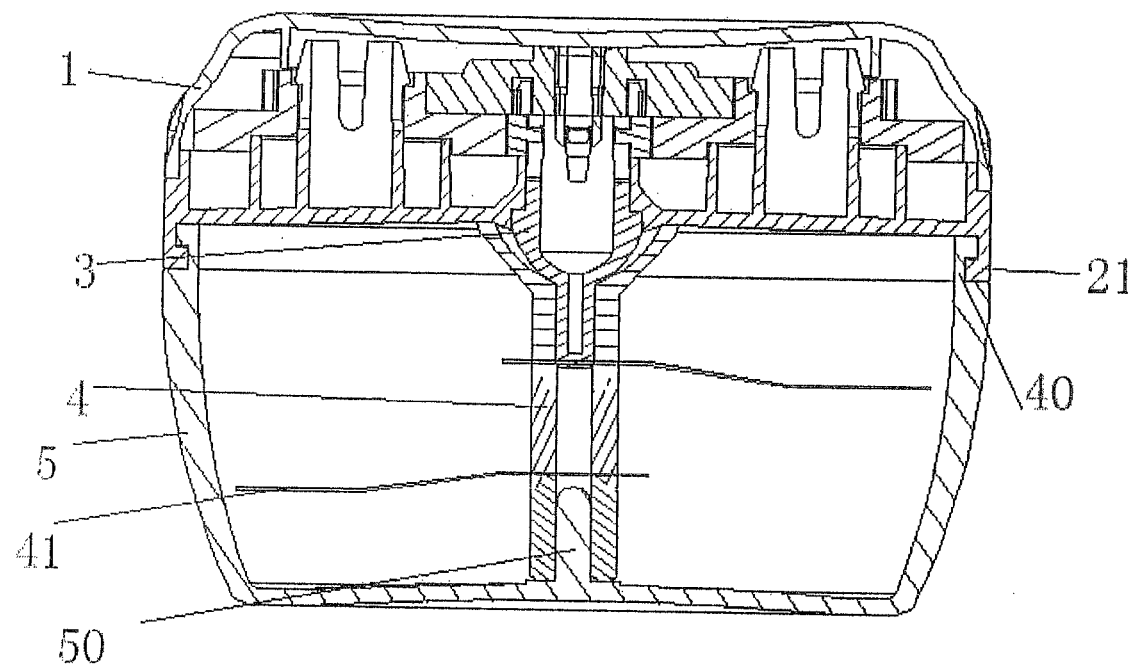
FIG. 5 shows a cross-section view of the apparatus after being assembled.

A manually drivable food cutter shown in FIGS. 1-5 includes a cap 1, a base 2, a gear shaft 3, a blade shaft 4 and a vessel 5.

There is an axle journal 10 on the cap 1, and on the base 2 there is a gear part which includes four gears 201, 202, 203, 204. The four gears 201, 202, 203, and 204 may be of a gear type, such that teeth of the each of the gears are disposed on an outer circumference of each gear. The big gear 201 and the small gear 202 are set in the middle, and the left gear 203 and right gear 204 are set respectively on the left and on the right. The big gear 201 meshes with the upper part of the left and right gear 203, 204, while the small gear 202 meshes with the lower part of the left and right gear 203, 204. Between the left and right gear 203, 204, there is a slot for the mounting member 230, 231 to go through and fix the left and right gears 203, 204 on the surface of base 2 respectively; the lower end of the gear shaft 3 is connected to the upper end of the blade shaft 4, and the upper end of the gear shaft 2 goes through the slots in the middle of big gear 201 and small gear 202 sequentially to connect to the axle journal 10 on the cap 1; the upper end of the blade shaft 4 connects to the gear shaft 3 via the orifice 22 on the surface of base 2, and on the blade shaft 4 there are one or more blades 41; the vessel 5 for containing food which is going to be processed is a transparent cup, and can be covered by the base 2. On the inner bottom surface, an axle journal 50 is set approximate axially, the blade shaft 41 is connected to it and can rotate freely.

In the case of using the apparatus, the vessel 5 should be held in one hand, and the cap 1 should be rotated by the other hand. When the cap 1 turns, the axle journal 10 of cap 1 can transmit the rotation to the big gear 201 in the middle. For example, when the cap 1 is turned clockwise, the big gear 201 in the middle will make the left and right gears 203, 204 rotate counterclockwise; at the same time, the lower part of the left and right gears 203, 204 make the small gear 202 rotate clockwise, so the blade shaft 4 rotates with the gear shaft 3 of the small gear, the blades 41 cut the food in the vessel, and the construction mentioned above can make the rotation of blades 41 more swift and make the operation more laborsaving because of the gears used.

There are one or more wedges 21 on the inner edge of the bottom of the base (see FIGS. 3, 4), and there are also one or more corresponding slots 40 on the outer edge of the upper surface of the vessel. When the base 2 covers on the vessel 5, the protrusion 21 will be adjusted to the position of the slots 40 and screwed slightly clockwise, and the base 2 will be stuck to the slots 40 on the vessel to ensure that the whole structure will not fall apart while being used.

The invention claimed is:

1. A manually drivable food cutter, comprising:
a cap with an axle journal;
a blade shaft including one or more blades disposed thereon;

a vessel connected to the blade shaft;

a base connecting the cap and the vessel and having the blade shaft disposed thereon;

a gear shaft set above the base;

a gear part transmitting a rotation of the cap to the blade shaft to thereby cause the blade shaft and blades to rotate within the vessel and at a rotational speed that is greater than a rotational speed of the cap, the gear part being formed on the base and including a big gear and a small gear disposed coaxially; and a gear shaft located on the big gear and connected to the small gear, wherein the gear part further includes a left gear and a right gear, an upper part of the left and the right gears mesh with the big gear, and the lower part of the left and the right gears mesh with the small gear.

2. The apparatus of claim 1, further comprising:

one or more protrusions on an inner edge of a bottom of the base; and one or more corresponding slots on an outer edge of an upper surface of the vessel.

3. The apparatus of claim 1, further comprising:

one or more protrusions on an inner edge of a bottom of the base; and one or more corresponding slots on an outer edge of an upper surface of the vessel.

4. The apparatus of claim 1, wherein an upper end of the gear shaft is disposed sequentially through a slot in a center of the big gear and a slot in a center of the small gear and is connected to the cap, and a lower end of the gear shaft is connected to the blade shaft through an opening in the base.

5. The apparatus of claim 1, further comprising:

a mounting member on the base and connected to the cap, wherein the left and the right gear each respectively include a slot to connect to the mounting member.

6. The apparatus of claim 1, further comprising:

a mounting member on the base and connected to the cap, wherein the left and the right gear each respectively include a slot to connect to the mounting member.

7. The apparatus of claim 1, further comprising a protrusion on an inner surface of the vessel to connect the vessel to the blade shaft.

8. The apparatus of claim 1, further comprising a protrusion on an inner surface of the vessel to connect the vessel to the blade shaft.

* * * * *